United States Patent
Itoh et al.

(10) Patent No.: US 10,739,446 B2
(45) Date of Patent: Aug. 11, 2020

(54) RANGE-FINDING DEVICE

(71) Applicant: Ricoh Company, Ltd., Ohta-ku, Tokyo (JP)

(72) Inventors: Masahiro Itoh, Kanagawa (JP); Shu Takahashi, Kanagawa (JP); Yasuhiro Nihei, Kanagawa (JP); Takeshi Ogawa, Kanagawa (JP); Hiroaki Tanaka, Tokyo (JP); Koji Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 369 days.

(21) Appl. No.: 15/408,936

(22) Filed: Jan. 18, 2017

(65) Prior Publication Data

US 2017/0212224 A1   Jul. 27, 2017

(30) Foreign Application Priority Data

Jan. 25, 2016   (JP) .................................. 2016-011579

(51) Int. Cl.
| | | |
|---|---|---|
| G01S 7/48 | (2006.01) | |
| G01S 7/4865 | (2020.01) | |
| G01S 17/10 | (2020.01) | |
| G01S 17/89 | (2020.01) | |

(52) U.S. Cl.
CPC ............ G01S 7/4865 (2013.01); G01S 17/10 (2013.01); G01S 17/89 (2013.01)

(58) Field of Classification Search
None
See application file for complete search history.

(56) References Cited

U.S. PATENT DOCUMENTS

| | | | |
|---|---|---|---|
| 2005/0024249 A1* | 2/2005 | Pavicic | H03M 1/127 |
| | | | 341/155 |
| 2009/0262760 A1* | 10/2009 | Krupkin | G01S 7/414 |
| | | | 372/6 |
| 2010/0149020 A1* | 6/2010 | Arnold | G01S 13/48 |
| | | | 342/90 |

(Continued)

FOREIGN PATENT DOCUMENTS

| | | |
|---|---|---|
| JP | 2006-337309 | 12/2006 |
| JP | 2010-096730 | 4/2010 |

(Continued)

*Primary Examiner* — Hovhannes Baghdasaryan
(74) *Attorney, Agent, or Firm* — Xsensus LLP

(57) ABSTRACT

A range-finding device including a light-emitting device, an imaging unit, a calculator, and a controller. The image unit receives pulsed light reflected from an object within the space for a plurality of time periods in a time-division manner, electrically converts the pulsed light into an electrical signal, and accumulates electric charge of the electrical signal for each of the plurality of time periods. The calculator calculates a time difference between emission of the pulsed light and reception of the pulsed light reflected from the object based on the electric charge accumulated for each of the plurality of time periods and determine a distance to the object based on the time difference. The controller controls the timing of reception of the pulsed light for each of the plurality of time periods at the imaging unit according to an intensity of the pulsed light reflected from the object.

10 Claims, 4 Drawing Sheets

(56) References Cited

U.S. PATENT DOCUMENTS

| | | | |
|---|---|---|---|
| 2011/0080580 A1* | 4/2011 | Fermann | G01N 21/31 356/301 |
| 2012/0044476 A1* | 2/2012 | Earhart | G01S 3/7867 356/4.01 |
| 2015/0293229 A1* | 10/2015 | Halmos | G01S 17/895 356/139.04 |
| 2016/0370460 A1 | 12/2016 | Takahashi et al. | |

FOREIGN PATENT DOCUMENTS

| | | |
|---|---|---|
| JP | 2011-013138 | 1/2011 |
| JP | 2011-064498 | 3/2011 |
| JP | 2013-134173 | 7/2013 |
| JP | 2015-068748 | 4/2015 |
| JP | 2016-008875 | 1/2016 |
| JP | 2017-009339 | 1/2017 |

* cited by examiner

RANGE-FINDING DEVICE

CROSS-REFERENCE TO RELATED APPLICATION

This patent application is based on and claims priority pursuant to 35 U.S.C. §119(a) to Japanese Patent Application No. 2016-011579, filed on Jan. 25, 2016 in the Japan Patent Office, the entire disclosure of which is hereby incorporated by reference herein.

BACKGROUND

Technical Field

Embodiments of the present disclosure relate to a range-finding device.

Related Art

A Time of Flight (TOF) sensor is one type of range-finding device for measuring a three-dimensional shape of an object, which uses the elapsed time to the time at which emitted-pulsed light having been reflected by an object return to measure the distance to the object. One specific type of TOF sensor is a phase-difference TOF sensor that divides reflected light into signal components having different time periods and determines a distance according to a ratio between the signal components for the respective time periods.

In such a TOF sensor, light reflected from a near target relative to the TOF sensor has a greater light intensity than light reflected from a distant target, and the light intensity of the light reflected from the distant target is weaker than the intensity of the light reflected from the near target. The reflected light having a greater intensity allows for precise range finding. Accordingly, with an increase in amount of pulsed light to increase the accuracy of the range finding with light reflected from a distant target, the intensity of light reflected from the near target might reach a level of saturation. There are techniques that prevent a reduction in precision of measurement due to the saturation of intensity of light reflected from the near target.

SUMMARY

In an aspect of this disclosure, there is provided an improved range-finding device including a light-emitting device to emit pulsed light to a space to be measured, an imaging unit, a calculator, and a controller. The image unit receives the pulsed light reflected from an object within the space for a plurality of time periods in a time-division manner, electrically converts the pulsed light into an electrical signal, and accumulates electric charge of the electrical signal for each of the plurality of time periods. The calculator calculates a time difference between emission of the pulsed light and reception of the pulsed light reflected from the object based on the electric charge accumulated for each of the plurality of time periods and determines the distance to the object based on the time difference. The controller controls operations of the light-emitting device and the imaging unit. The controller also controls a timing of reception of the pulsed light for each of the plurality of time periods at the imaging unit according to the intensity of the pulsed light reflected from the object.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
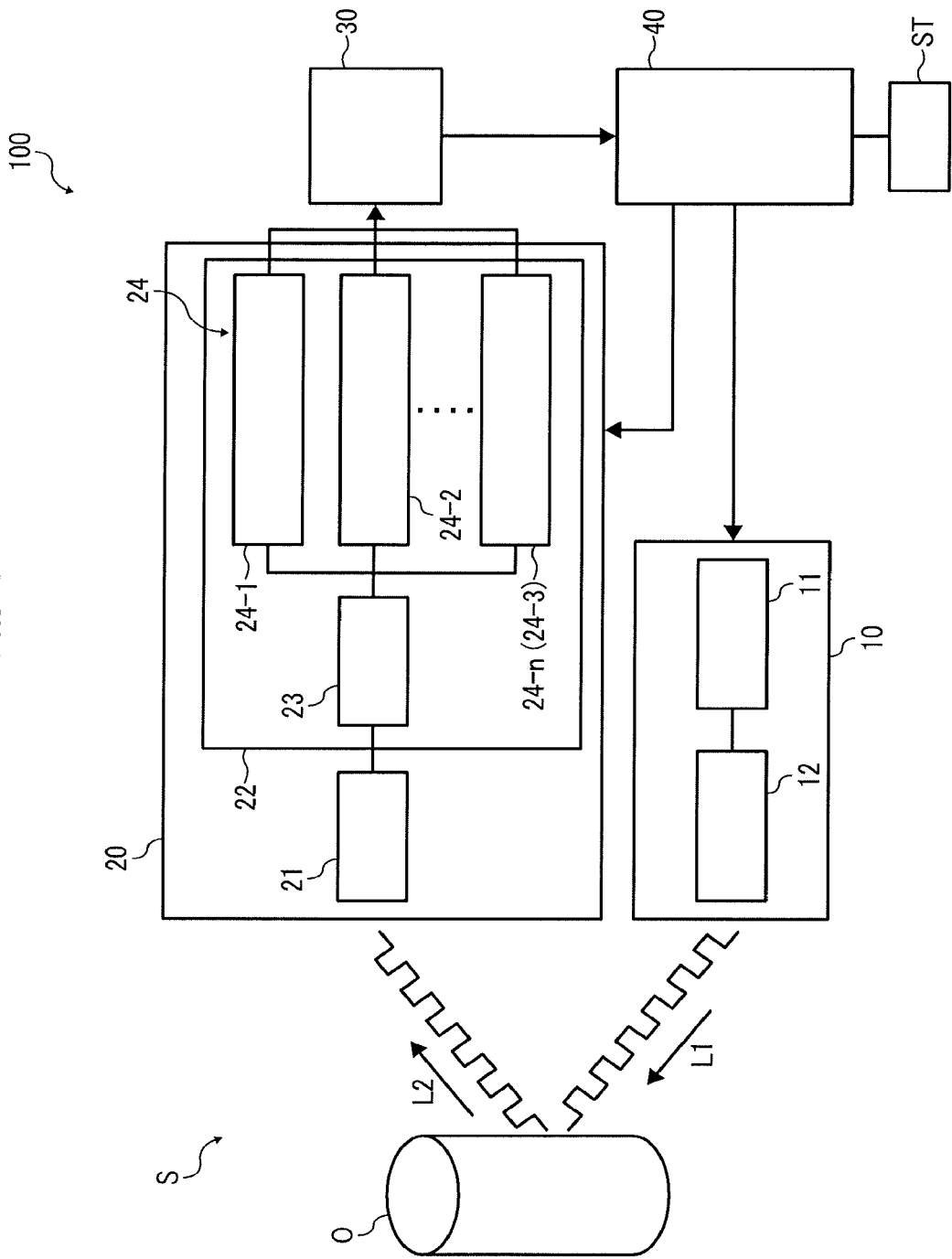
FIG. 1 is a schematic illustration of a configuration of a range-finding device according to Example 1 of an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Example 1

A description is given of a range-finding device 100 according to Example 1 as an example of a range-finding device according to an embodiment of the present disclosure, referring to the Figures. FIG. 1 is a schematic illustration of a configuration of a range-finding device 100 according to Example 1 of an embodiment of the present disclosure. As illustrated in FIG. 1, the range-finding device 100 includes an irradiator 10 as a light-emitting device, an imaging unit 22, a calculator 30, and a controller 40. The imaging unit 22 includes a light receiver 20. The range-finding device 100 according to Example 1 measures a distance to an object O to be measured using phase difference detection, which is one type of Time of Flight (TOF) system.

The controller 40 controls the entire operation of the range-finding device 100. The controller 40 connects the irradiator 10, the light receiver 20, and the calculator 30, and serves as an irradiation controller to control the irradiator 10, a light-reception controller to control the light receiver 20, and a calculation controller to control the calculator 30.

The irradiator 10 generates pulsed light as emitted light L1, and irradiates the object O within a target space S to be measured, with the emitted light L1. The irradiator 10 includes a light emitter (light source) 11 and a light-emitting optical system 12.

The controller 40 controls the light emitter 11 to output the emitted light L1. In the present embodiment, the light emitter 11 emits infrared light as the emitted light L1. However, the present disclosure is not limited to infrared light. Alternatively, near-infrared light or visible light may be employed. For example, the controller 40 is configured to control the light emitter 11 to output infrared light having a wavelength of 870 nanometers (nm) with an output power of 3 watts (W) for a time period (emitted-light pulse width) of 40 nanoseconds (ns). The light-emitting optical system 12 includes a plurality of image-forming lenses and emits the emitted light L1 output from the light emitter 11, to the target space S.

Note that the light emitter 11 may include a plurality of light-emitting points disposed in a linear array or in a matrix manner. Specific examples of the light emitter 11 may include solid-state light emitting elements, such as laser diodes (LDs) and light-emitting diodes (LEDs).

The light receiver 20 receives reflected light L2 that is the emitted light L1 (pulsed light, also referred to as the emitted-pulsed light) output from the irradiator 10 and reflected from the object O, and performs the photoelectric conversion to accumulate electric charge. The light receiver 20 includes an imaging optical system 21 and an imaging unit 22. The imaging optical system 21 includes a plurality of image-forming lenses and an aperture stop to collect the reflected light L2 and focuses an image of the reflected light L2 onto the imaging unit 22.

The imaging unit 22 receives the reflected light L2 of which the image has been formed by the imaging optical system 21, and performs the photoelectric conversion on the received reflected light L2 to accumulate electric charge. The imaging unit 22 includes an image sensor 23 and a storage unit 24 to store accumulated electric charge. The storage unit 24 includes a first storage unit 24-1, a second storage unit 24-2, . . . , and a n-th storage unit 24-$n$ for the respective time periods of light reception. In the present Example, n is 3. The imaging unit 22 is a solid-state image sensor, such as a Charge-Coupled Device (CCD) or a Complementary Metal Oxide Semiconductor (CMOS) image sensor.

The image sensor 23 receives and subjects some of the reflected light L2, of which an image has been formed by the imaging optical system 21, to the photoelectric conversion during each of predetermined plurality of time periods of light reception in a time-division manner, for each pixel. The controller 40 controls the timing of light emission (phase) for each of the time periods of light reception.

The first storage unit 24-1 through the n-th storage unit 24-$n$ accumulate the electric charge having been received and subjected to the photoelectric conversion by the image sensor 23 and output the accumulated electric charge to the calculator 30 in the time periods of light reception, respectively.

The calculator 30 as a distance calculator calculates a phase difference (i.e., a time difference) between the electrical signal of the emitted light L1 and the electrical signal of the reflected light L2 based on the amounts of electric charge accumulated in the first storage unit 24-1 through the n-th storage unit 24-$n$, and determines a distance to the object O based on the phase difference.

In some embodiments, the calculator 30 and the controller 40 may be disposed in, e.g., an information processing device (for example, a personal computer (PC)) separate from the irradiator 10 and the light receiver 20. In some embodiments, the calculator 30 and the controller 40 may be disposed in, e.g., an information processing device (for example, a personal computer (PC)) separate from the irradiator 10 and the light receiver 20. The information processing device may include, e.g., a Central Processing Unit (CPU) and a memory, such as Read Only Memory (ROM) and a Random Access Memory (RAM). The calculator 30 and the controller 40 control the calculation process and the operation of the range-finding device 100 in accordance with a program loaded in the memory.

The following describes the procedure of controlling the timings of light reception by the controller 40 in the above-described range-finding device 100 according to Example 1, referring to the Figures. In the following description of the control of the timing of light emission according to Example 1, a description is first given of an example control of the timing of light reception in the three-phase system as an example of the TOF sensor according to a comparative example, referring to the timing chart of FIG. 2A.

Figure 2A:
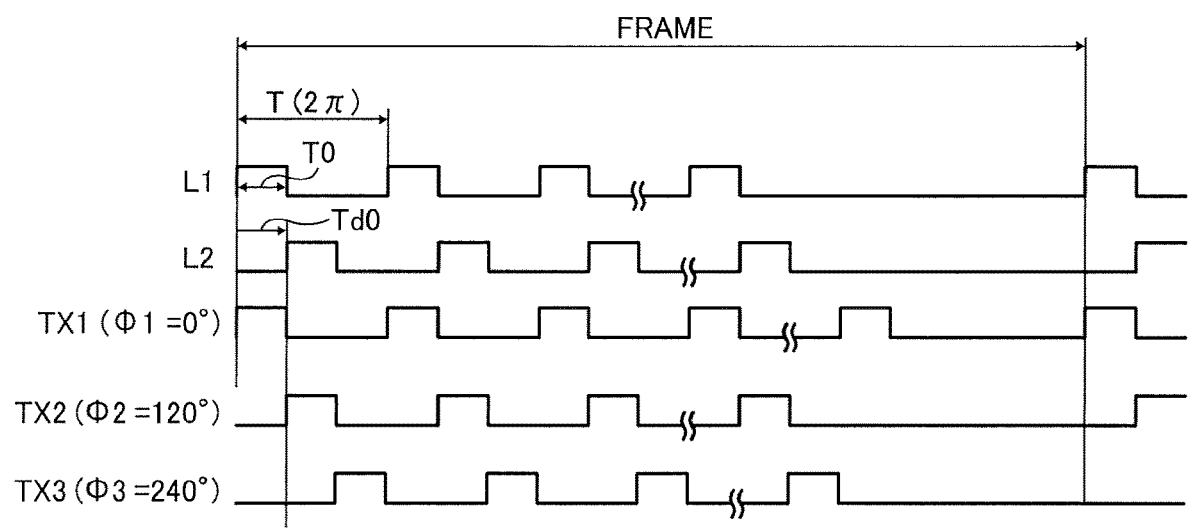
FIG. 2A is a timing chart of the timing of emission of emitted light and the timing of reception of reflected light for a plurality of time periods in a range-finding device according to a comparative example.

FIG. 2A represents the emitted light L1 that has been emitted for a plurality of times during one frame, and a signal reflected from the object O that is read at an interval of 120° such that the reflected signal is temporally divided into phase signals with phase differences of $\phi 1$ (0°), $\phi 2$ (120°), and $\phi 3$ (240°). The symbols "TX1", "TX2", and "TX3" in FIG. 2A represent identification (ID) numbers of timings of light reception in the respective time periods of light reception. Further, the symbols "$\phi 1$", "$\phi 2$", and "$\phi 3$" refer to a phase difference between the timing of light emission of the emitted light L1 and each of the timings of light reception TX1, TX2, and TX3.

In this case, the light emission cycle of the emitted light L1 is T ($2\pi$), and the light-emission pulse width is T0. In FIG. 2A, the timing of the reflected light L2 represents the time at which the reflected light L2 having been reflected from a nearest position within the area to be measured returns to the range-finding device 100 with a delay time (time difference) of Td0. Hereinafter, the symbol "Td0" is referred to as "delay time".

In determining a distance to the object O to be measured by using the three-phase system, the following formulas (1) and (2) are used to determine a Quadrature Phase component (Q) and an In Phase component (I) based on the signals (electric charge) Ci received at the timings of light reception TX1 through TX3 with phase differences of $\phi 1$ (0°) (which is the same timing as the timing of light emission of the emitted light L1 (emitted-pulsed light)), a phase difference of $\phi 2$ (120°), and a phase difference of $\phi 3$ (240°), relative to the timing of light emission of the emitted light L1. In formulas (1) and (2), N denotes the number of time periods of light reception (N is greater than or equal to 2), and i denotes ID numbers of the time periods (i is greater than or equal to 1 and less than or equal to N):

$$Q = \Sigma[Ci \times \sin\{(2\pi/N) \times (i-1)\}] \qquad (1), \text{ and}$$

$$I = \Sigma[Ci \times \cos\{(2\pi/N) \times (i-1)\}] \qquad (2).$$

The following formula (3) is used to determine a phase difference $\phi$ [rad] between the emitted light L1 and the reflected light L2 by using the values of Q and I obtained from the above-described formulas (1) and (2):

$$\phi = \arctan(Q/I) \qquad (3).$$

The time difference between the irradiation (emission) of the emitted light L1 and the reception of the reflected light L2, i.e., a delay time Td is expressed by the following formula (4) using the phase difference φ obtained by the above-described formula (3):

$$Td = \phi/2\pi \times T \qquad (4).$$

Then, the following formula (5) that is derived from the above-described formula (4) and the speed of light C [m/s] is used to determine a distance d to an object O to be measured:

$$d = c\phi/2\pi \times T \qquad (5).$$

As illustrated in FIG. 2A according to the comparative example, the delay time Td0 of the reflected light L2 that has been reflected from a nearest position coincides with the timing of light reception TX2. In such a case, the amount of the emitted light L1 emitted from the irradiator 10 is preferably reduced to prevent saturation of the amount of electric charge accumulated in the imaging unit 22 at the timing of light reception TX2. The intensity of the reflected light that is reflected from a distant target is inversely proportional to the square of the distance. Accordingly, when the amount of irradiation of the emitted light L1 is set according to the intensity of the reflected light L2 reflected from a close-distance position, a sufficient amount of the reflected light L2 reflected from a distant target is difficult to obtain.

To handle such circumstances, the range-finding device 100 according to Example 1 of the present disclosure incorporates the controller 40 to adjust the timings of light reception in the plurality of time periods of light reception according to the intensity of the reflected light L2 reflected from the nearest position. This configuration according to Example 1 of the present disclosure successfully prevents the saturation of the amount of the reflected light L2 reflected from the near target and obtains a sufficient amount of the reflected light L2 reflected from the distant target with an increase in the amount of irradiation of the emitted light L1.

Figure 2B:
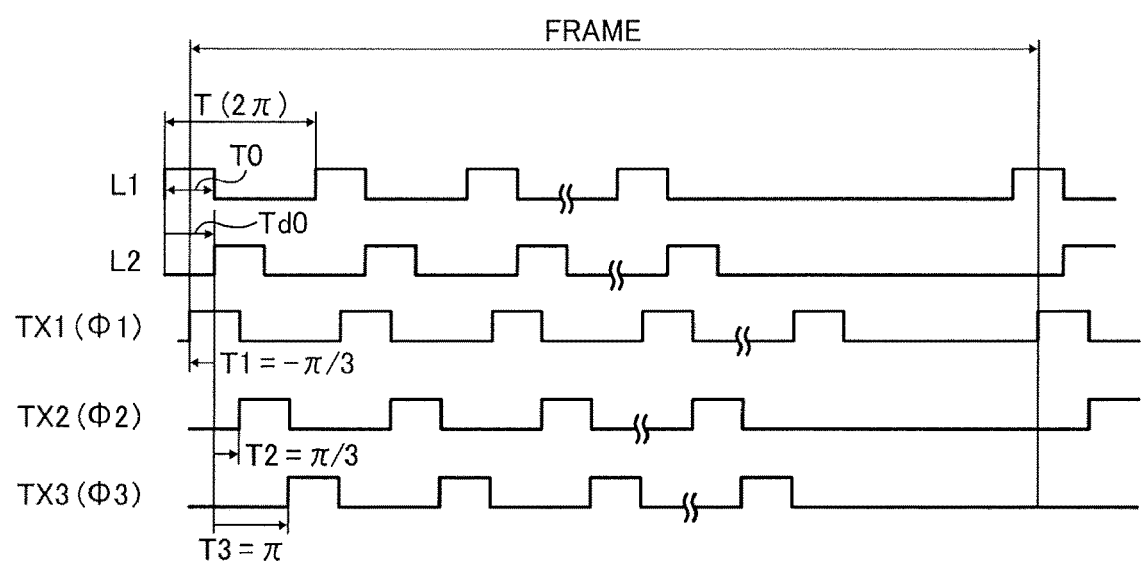
FIG. 2B is a timing chart of the timing of emission of emitted light and the timing of reception of reflected light for a plurality of time periods in a range-finding device according to Example 1.

The following describes an example control of the timing of light reception of the controller 40, referring to FIG. 2B. In Example 1 as well, a description is given of cases in which the reflected light L2 is received at the timings of light reception TX1, TX2, and TX3 over three time periods of light reception in a temporally-divided manner. The symbols "T1", "T2", and "T3" in FIG. 2B represent phase differences between the reception of the reflected light L2 having the greatest intensity (that is reflected from the nearest position) and the timings of light reception TX1, TX2, and TX3, respectively. Further, the symbols "φ1", "φ2", and "φ3" refer to phase differences between the emission of the emitted light L1 (pulsed light) and the timings of light reception TX1, TX2, and TX3, respectively.

As illustrated in the timing chart of FIG. 2B according to Example 1, the phase differences T1 through T3 of the timings of light reception TX1 through TX3 in the respective time periods of light reception are determined relative to the delay (delay time Td0) of a signal of the reflected light L2 that is reflected from the nearest position. In other words, the controller 40 controls the imaging unit 22 to read the phase signal of the timing of light reception TX1 (φ1) with a phase difference (phase lead) T1 of $-\pi/3$, the phase signal of the timing of light reception TX2 (φ2) with a phase difference (phase delay) T2 of $\pi/3$, and the phase signal of the timing of light reception TX3 (φ3) with a phase difference (phase delay) T3 of $7\pi/3$ relative to the delay time of Td0.

Such a control configuration receives reflected light L2 that is reflected from the nearest position at two different times TX1 and TX2, and distributes electric charge of the received light into the first storage unit 24-1 and the second storage unit 24-2 to accumulate the electric charge in the first storage unit 24-1 and the second storage unit 24-2. Accordingly, the greatest value of the amount of electric charge accumulated in each of the first storage unit 24-1 and the second storage unit 24-2 can be reduced by approximately half compared to a case in which the reflected light is received all at once and the electric charge is accumulated in one storage unit. Further, the electric charge of the reflected light L2 reflected from a distant target is stored in the third storage unit 24-3 without being saturated in the third storage unit 24-3. Accordingly, even with approximately double the amount of light (emitted light L1) emitted from the irradiator 10 compared to a typical amount of emitted light in the range-finding device according to a comparative example, the amount of charge of the light reflected from a close-distance position is prevented from being saturated in the imaging unit 22, and double the amount of light reflected from the distant target is obtained compared to a typical amount of light in the range-finding device according to the comparative example. As a result, the precision of measurement of the range-finding device 100 can be increased.

Figure 3:
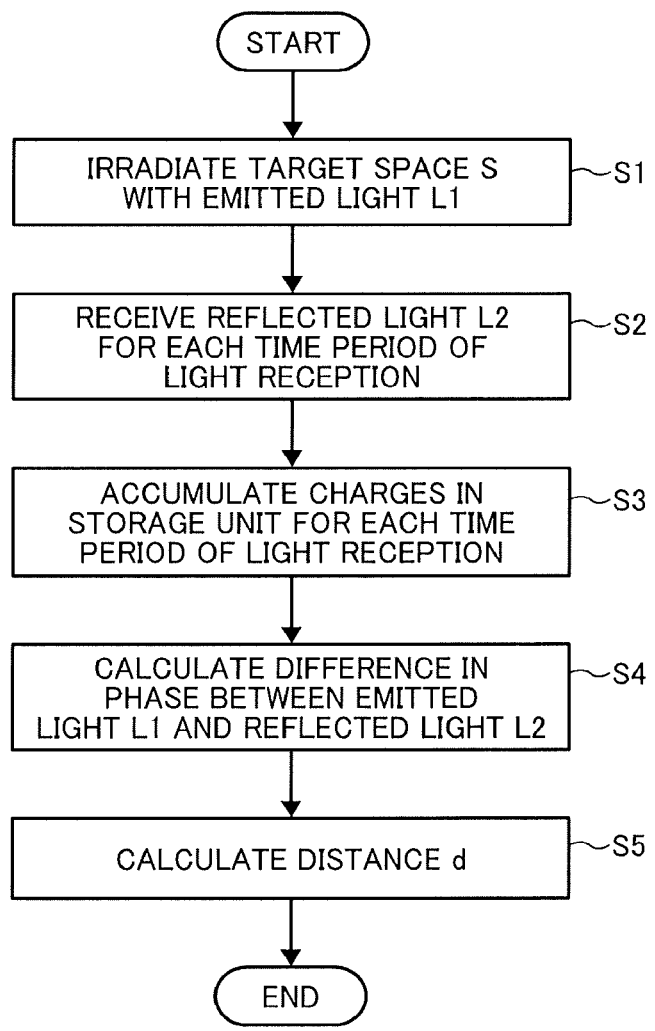
FIG. 3 is a flow chart of an example operation of the range finding of the range-finding device according to Example 1.

The following describes the procedure for measuring a distance (a distance measuring method) of the range-finding device 100 according to Example 1 in which the above-described timings of light reception are set, referring to the flowchart of FIG. 3.

In the range-finding device 100 according to Example 1, the irradiator 10 emits pulsed light (the emitted light L1) with a light-emission cycle T ($2\pi$) and a light-emission pulse width T0, to a space S to be measured (step S1). The irradiator 10 irradiates the object O within the space S with the emitted light L1, and the emitted light L is reflected by the object O and enters the light receiver 20 as the reflected light L2.

In the light receiver 20, the image sensor 23 receives and converts the reflected light L2 into electric charge through the photoelectric conversion at each of the timings of light reception TX1 through TX3 as described above in a time-division manner (step S2). The electric charges, which have been subjected to the photoelectric conversion by the image sensor 23, are stored in the first storage unit 24-1 through the third storage unit 24-3 at the timings of light reception TX1 through TX3, respectively (step S3).

When the light receiver 20 completes receiving light for one frame, the calculator 30 reads voltage signals according to the electric charge output from the first storage unit 24-1 through the third storage unit 24-3, and calculates, based on the voltage signals, phase differences φ (φ1, φ2, and φ3) between the emitted light L1 and the reflected light L1 using the above-described formulas (1) through (3) (step S4). Subsequently, the calculator 30 determines, based on the calculated phase differences φ, a distance d using the above-described formulas (4) and (5) (step S5).

The present disclosure is not limited to the configuration and the procedure of the range finding of the range-finding device 100 according to Example 1. Thus, variations of the range-finding device 100 according to Example 1 are as follows.

[Variation 1]

As Variation 1 a nearest position is preliminarily set within an area to be measured in the range-finding device 100 according to Example 1. With such a configuration, a delay time Td0 of the reflected light L2 that is reflected from an object O at the nearest position is known.

Further, when the three-phase system is used to determine phase differences φ of the phase signals obtained at the timings of light reception TX1 through TX3 under the control as illustrated in FIG. 2B. Thus, the above-described formula (3) is replaced with the following formula (6):

$$\phi = \arctan(Q/I) - \pi/3 \qquad (6).$$

The above-described formula (5) determines a distance d to an object at the nearest position within the area to be measured, using the phase differences φ obtained by the above-described formula (6). This allows a rapid calculation of the distance to the object O to be measured without a complex calculation.

Further, such a configuration allows receiving the reflected light L2 that is reflected from the nearest position at two different times TX1 and TX2, and distributes the electric charge of the received light into the first storage unit 24-1 and the second storage unit 24-2 to accumulate the electric charge in the first storage unit 24-1 and the second storage unit 24-2. Thus, the saturation of the amount of the reflected light L2 reflected from near targets can be prevented. Accordingly, the amount of light (the reflected light L2) reflected from the nearest position increases to approximately double that of the reflected light received in the TOF system, and a reduction in amount of the reflected light L2 reflected from an object O at a distant target is successfully prevented. Thus, the configuration according to Variation 1 achieves the range-finding device 100 that measures a distance within the area to be measured with high precision.

[Variation 2]

In Example 1 and Variation 1, cases in which the three-phase system is employed for the range finding operation are described. However, the range-finding device according to the present disclosure is not limited to the three-phase system. Thus, a range-finding device that employs N time periods for receiving light where N is greater than or equal to two is also applicable in the present disclosure. In such a range-finding device according to Variation 2, the timings of light reception for the respective N time periods of light reception each has a time difference of $\{(2i-3)/N\}\pi$ relative to the delay time Td0 of a received-light signal of the reflected light L2 having been reflected from the nearest position within an area to be measured. In the expression of $\{(2i-3)/N\}\pi$, N denotes the number of time periods of light reception (N is greater than or equal to 2), and i denotes ID numbers of the time periods (i is greater than or equal to 1 and less than or equal to N):

The following formula (7) determines a phase difference (I) in the case of receiving light reflected from the nearest position. Such a determination of a phase difference (I) allows obtaining a distance to an object O at the nearest position in any other phase system except for the three-phase system.

$$\phi = \arctan(Q/I) - \pi/N \qquad (7).$$

[Variation 3]

The range-finding device 100 according to Variation 3 allows appropriately setting the timings of light reception according to changes in area to be measured. In other words, the controller 40 preliminarily extracts a shortest distance before a start of the range finding. Based on the reflected light L2 reflected from the preliminarily extracted shortest distance, the controller 40 controls the timing of light reception. In Variation 3 with such a configuration, a preliminary operation is performed prior to a range finding in the range-finding device 100 according to Example 1. Specifically, a reference object, such a plate screen, is placed at the nearest position within the area to be measured in the space S to be measured. Subsequently, the calculator 30 calculates a time difference between the emission of the emitted light L1 (pulsed light) and the reception of the reflected light L2 that is reflected from the reference object. The controller 40 determines, based on the calculated time difference as the delay time Td0, the timings of light reception TX1 through TXn for the time periods of light reception, respectively at the light receiver 20.

The controller 40 controls the irradiator 10 to emit light (the emitted light L1) of which the amount of light emission is set close to (lower than) the amount of light that reaches a level of saturation in a plurality of storage units 24 of the light receiver 20 that receives the reflected light L2 reflected from the object at the nearest position within the area to be measured. This configuration suitably determines a space S to be measured, and successfully increases the precision of the measurement of a distance to the object O within the space S. To perform the above-described preliminary operation process, a user selects a mode, such as an initial setting mode, that is preliminarily set in the range-finding device 100, via a selector ST, such as a menu screen or menu buttons.

[Variation 4]

Figure 4:
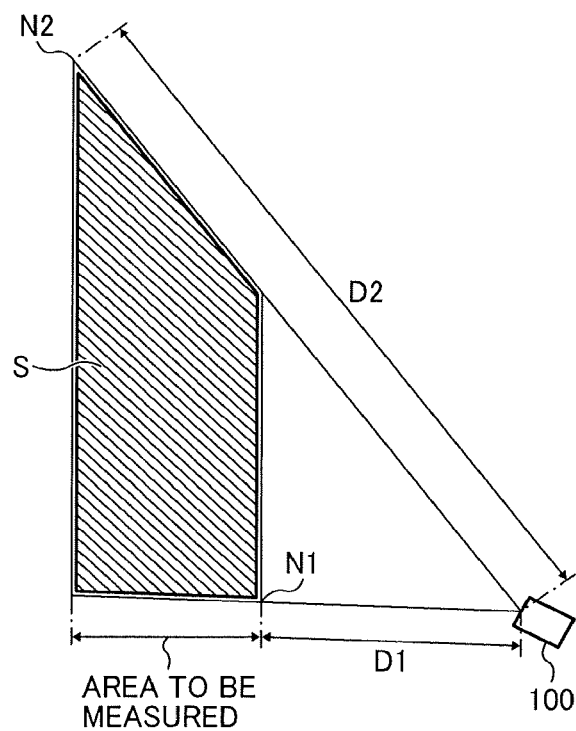
FIG. 4 is an illustration of the relation between the range-finding device and an area to be measured when the range-finding device according to Example 1 is used with a space to be measured located above the device, according to Variation 4.

Next, a description is given of aspects according to variation 4, referring to FIG. 4. FIG. 4 is an illustration of the relation between the range-finding device 100 and an area to be measured when the range-finding device 100 with the same configuration as the configuration of the range-finding device according to Example 1 is used with a space S to be measured being located above the range-finding device 100.

As illustrated in FIG. 4, a nearest position from the range-finding device 100 within the area to be measured is the position "N1" in the lower limit of the space S and close to the range-finding device 100. In FIG. 4, a longest-distance position from the range-finding device 100 within the area to be measured is the position "N2" in the upper limit of the space S and distant from the range-finding device 100. When the symbol "D1" denotes the direct distance from the range-finding device 100 to the position N1 and the symbol "D2" denotes the direct distance from the range-finding device 100 to the position N2, the area to be measured by the range-finding device 100 is an area (the shaded portion in FIG. 4) that ranges from the distance D1 to the distance D2. In the range-finding device 100 according to Variation 4 with the above-described relative positions, each of the distances D1 and D2 in the area to be measured differs for each pixel of the imaging unit 22, and the intensity of the reflected light L2 differs for each pixel as well.

In such a configuration as well, a screen is placed at the position N1 that is the nearest position from the range-finding device 100, and the intensity of the reflected light L2 reflected from the screen is measured. The controller 40 determines the time difference (delay time) TD0 of the reflected light L2 reflected from a coordinate (a certain position on the screen) from which the reflected light L2 having the greatest intensity returns. Thus, the controller 40 appropriately determines the timing of light reception based on the delay time Td0.

That is, in the configuration according to Variation 4, there may be some cases in which the intensity (the amount) of the reflected light L2 reflected from, e.g., around the center (the intersection of the optical axis of the irradiator 10 and the screen) of the screen is greater than the intensity of the reflected light L2 reflected from the position N1 that is the nearest position in the lower limit of the assumed area to be measured, according to the light quantity distribution of the irradiator 10 of the range-finding device 100. Accordingly, the controller 40 determines the time difference as the delay time Td0 between the emission (irradiation) of the emitted light L1 and the reception of the reflected light L2 reflected from the position from which the reflected light L2 having the greatest intensity returns to prevent the saturation of pixels that receive the reflected light L2 reflected from the position with the greatest intensity. The controller 40 determines the timings of light reception for the respective time periods of light reception relative to the delay time Td0, and the imaging unit 22 receives the reflected light L2 reflected from the position with the greatest intensity at the determined timings and distributes the electric charge of the reflected light L2 into a plurality of storage units 24. This configuration prevents the saturation of the reflected light L2 reflected from the position with the greatest intensity and appropriately determines the amount of the reflected light L2 over the entirety of the area to be measured, thus increasing the precision of the measurement of a distance to an object within the area to be measured. This configuration suitably adjusts the timings of light reception according to the structure and usage pattern of the range-finding device.

Further, this configuration appropriately determines the timings of light reception for the respective time periods of light reception, for each pixel of the imaging unit 22. Accordingly, according to Variation 4 of the present disclosure, the saturation of the amount of light is prevented for each pixel, and the sufficient amount of light is obtained, thus successfully obtaining distance information of the object O with higher precision.

In the above-described range-finding device 100 according to Example 1 and variations, the irradiator 10 emits pulsed light as the emitted light L1 to the space S to be measured, and the imaging unit 22 receives the reflected light L2, which is the emitted light L1 having been reflected from the object O to be measured, over a plurality of time periods of light reception in a time-division manner. According to the configuration in which the pulse signal of the emitted light L1 is reflected by the object O and the pulse signal of the reflected light L2 is received by a light receiver with a delay time, the controller 40 determines the timings of light reception for the respective plurality of time periods of light reception in a regular or random manner based on the delay time Td0 of the light reflected from the nearest position within the area to be measured, to control the imaging unit 22 to receive the reflected light L2 during the plurality of time periods of light reception in a time-division manner. Alternatively, as the preliminary process, the controller 40 controls the calculator 30 to determine the distance from which the reflected light L2 having the greatest intensity returns, the controller 40 determines the timings of light reception for the respective plurality of time periods of light reception based on the delay time Td0 relative to the determined distance.

Such a control of the timings of light reception allows receiving light reflected from the nearest position or from the distance, from which the reflected light having the greatest intensity returns, over the plurality of time periods in a time-division manner, and reduces or prevents electric charge of photoelectrically-converted signals of the reflected light L2 reflected from a near target from being saturated in the storage units 24 that performs the photoelectric conversion on the reflected light L2 and accumulates the electric charge. This increases the intensity of the emitted light L1, and prevents a reduction in amount of the reflected light L2 reflected from a distant target. Accordingly, even with approximately double the amount of light (emitted light L1) emitted from the irradiator 10 compared to a typical amount of emitted light in the range-finding device according to a comparative example, the amount of charge of the light reflected from a near target or from the distance with the greatest light intensity is prevented from being saturated in the imaging unit 22, and a double the amount of light reflected from the distant target is obtained compared to a typical amount of light in the range-finding device according to the comparative example. As a result, the precision of the measurement of a distance to the object O is increased.

Modifying and adding design are permissible without going beyond the scope of the gist of the present disclosure. The number, position, and shape of the constituent elements are not limited to the Examples, and an appropriate number, position, and shape for implementing the present disclosure are available.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A range-finding device, comprising:
   a light emitter that emits pulsed light to a space to be measured;
   an imaging receiver that receives the pulsed light emitted from the light emitter and reflected from an object within the space; and
   processing circuitry configured to control the light emitter to emit the pulsed light with a light emission cycle of $T=2\pi$, wherein
   for each light pulse in the light emission cycle, the processing circuitry is configured to control the light receiver to receive the light pulse in a number N of time periods and according to a phase difference of $-1/(N\pi)$, each time period having a length of T/N,
   the light receiver includes an image sensor and N storage devices, each storage device of the N storage devices configured to accumulate an electric charge corresponding to the light pulse in a corresponding time period of the N time periods,
   the processing circuitry is further configured to set a starting time for the N time periods to be the phase difference earlier than a delay time, the delay time being an amount of time that the light pulse takes from an emission time that the light emitter emits the light pulse to a reception time of the light pulse having been reflected from the object, and
   the processing circuitry is further configured to determine a distance to the object based on a ratio between the electric charges accumulated in the N storage devices.

2. The range-finding device according to claim 1, wherein the processing circuitry adjusts the starting time according to the pulsed light reflected from a nearest position in the space to be measured.

3. The range-finding device according to claim 1, wherein the N is greater than or equal to two, and
reception of the pulsed light during each time period of the N time periods has a time difference of $\{(2i-3)/$ N}π(i is greater than or equal to 1 and less than or equal to N) relative to the delay time.

4. The range-finding device according to claim 1, wherein the processing circuitry determines the starting time according to an area of a location to be measured.

5. The range-finding device according to claim 4, wherein the processing circuitry is further configured to:
- select a mode to measure particular distances in the space,
- extract a reference distance, of a set of distances to the range-finding device, in the space, and
- determine the reception of each pulse of the pulsed light for each of the N time periods according to a delay time of the pulsed light reflected from a reference object at the reference distance.

6. The range-finding device according to claim 4, wherein the processing circuitry is further configured to:
- select a mode to measure particular distances in the space,
- extract a reference distance, to a position from which the pulsed light has a greatest intensity return, and
- determine the reception of each pulse of the pulsed light for each of the N time periods according to a delay time of the pulsed light reflected from a reference object at the position.

7. The range-finding device according to claim 4, wherein the processing circuitry is further configured to:
- select a mode to measure an intensity of the pulsed light reflected from the space, and
- control an amount of the pulsed light emitted from the light emitter according to a greatest intensity of the pulsed light reflected from the space.

8. The range-finding device according to claim 4, wherein the processing circuitry determines the starting time for each pixel in the imaging receiver.

9. The range-finding device according to claim 1, wherein the processing circuitry controls operations of the light emitter and the imaging receiver to avoid saturation of any of the N charge storage devices.

10. The range-finding device according to claim 1, wherein the processing circuitry controls operation of the light emitter and the imaging receiver to divide storages of accumulated charge between two charge storage devices of the N storage devices.

* * * * *